(No Model.)
G. F. WORNSTAFF.
COMBINED FLOUR BIN AND DOUGH BOARD.
No. 555,549. Patented Mar. 3, 1896.
Fig. I.
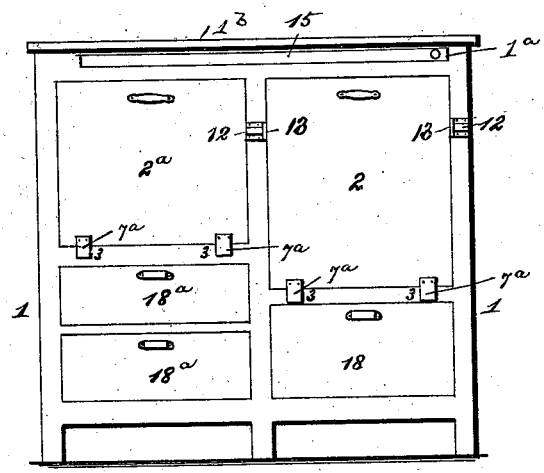
Fig. II.
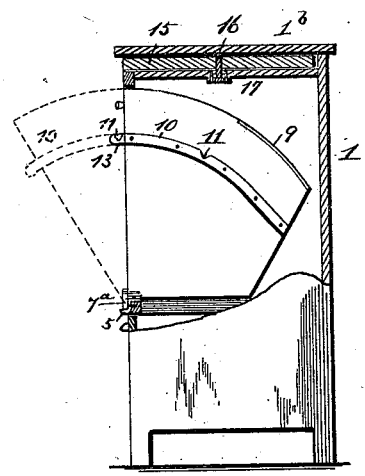
Fig. III.
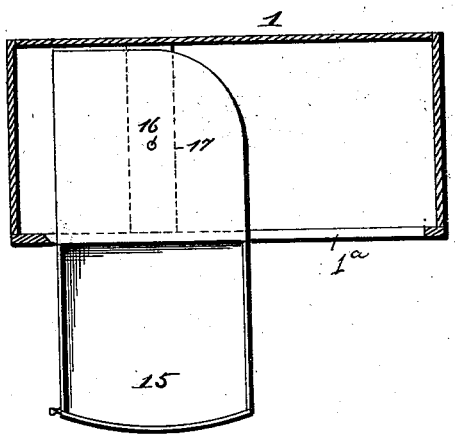
Fig. IV.
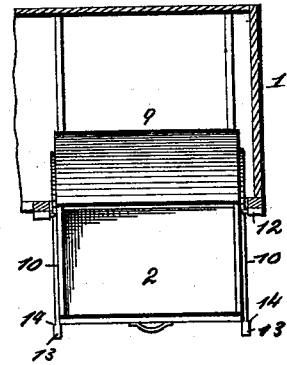
Fig. V.
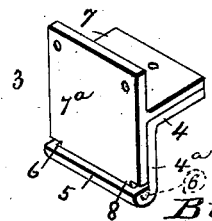
Witnesses:
F. G. Fischer
C. C. Brown
Inventor:
G. F. Wornstaff
By Knight Bros
Attys.

UNITED STATES PATENT OFFICE.

GEORGE F. WORNSTAFF, OF FORT SCOTT, KANSAS.

COMBINED FLOUR-BIN AND DOUGH-BOARD.

SPECIFICATION forming part of Letters Patent No. 555,549, dated March 3, 1896.

Application filed September 26, 1894. Serial No. 524,192. (No model.)

*To all whom it may concern:*

Be it known that I, GEORGE F. WORNSTAFF, a citizen of the United States, and a resident of the city of Fort Scott, in the county of Bourbon and State of Kansas, have invented certain new and useful Improvements in Kitchen-Cabinets, of which the following is a full, clear, and exact description, reference being had to the accompanying drawings, which form a part of this specification.

My invention relates to certain new and useful improvements in kitchen-cabinets; and my invention consists in certain features of novelty hereinafter described and claimed.

Figure I is a front elevation of my improved kitchen-cabinet. Fig. II is an end view, partly in cross-section, showing a bin open in dotted lines. Fig. III is a plan view showing the dough or kneading board out for use. Fig. IV is a plan view showing a bin open. Fig. V is a perspective view of a hinge upon which the bins are carried.

Similar reference-numbers refer to similar parts throughout the several views.

1 is the frame.

2 $2^a$ are bins.

3 are hinges by which the bins are carried on and supported in the frame. Said hinges are of peculiar construction, as shown in Fig. V, and consist of an angle-piece having a horizontal part 4 adapted to be secured to the frame, and a vertical part $4^a$ provided with the bench 5 at its lower end, having a recess 6, and a T-shaped detachable piece having horizontal part 7 adapted to be secured to a bin, and a vertical part $7^a$ also adapted to be sesured to the bin, provided with an extension 8, reduced in width and adapted to engage the recess 6 in the bench 5.

9 is a segmental cover over the rear portion of the bin to prevent the overflow of the contents upon the sudden or abrupt closing thereof.

10 are segmental metal strips along the sides of the bin 2, having notches 11 therein with which engage the spring catches or detents 12 when the bin is open.

13 are enlarged portions of said strips extending beyond the bin and provided with the shoulders 14, forming a stop against the frame when the bin is closed, the bin being retained in its closed position by the weight of the material therein.

15 is the dough or kneading board which is pivoted upon the pin 16 within a recess $1^a$ beneath the top $1^b$ of the cabinet, said pin being secured by flanges thereon to the under side of the cross-piece 17, as shown in Fig. II.

18 is a drawer located under the bin 2, and $18^a$ are drawers located beneath the bin $2^a$.

Having thus described my invention, the following is what I claim as new therein and desire to secure by Letters Patent:

1. A kitchen-cabinet comprising a frame, a bin and a hinge whereby the bin is supported in the frame; said hinge consisting of an angle-piece secured to the frame having the bench 5 formed with the recess 6, and the T-shaped piece 7 secured to the bin formed with the extension 8 thereon engaging in the recess in the bench; substantially as shown and described and for the purpose set forth.

2. The hinge consisting of the angle-piece adapted to be secured to the frame, the bench 5 thereon having the recess 6, the T-shaped piece 7 adapted to be secured to the bin and the extension 8 thereon adapted to engage in the recess in the bench; substantially as shown and described and for the purpose set forth.

3. A kitchen-cabinet comprising a frame 1, a swinging bin 2, hinged to the frame and provided with a notched segmental guide-strip 10 formed with an enlarged portion 13 and shoulder 14, and a catch 12; substantially as described.

4. A kitchen-cabinet comprising a frame 1, a swinging bin 2 and a hinge, whereby the bin is detachably secured to the frame consisting of an angle-piece formed with a horizontal part 4 secured to the frame, a vertical part $4^a$ having a bench 5 at its lower edge provided with a recess 6, and the T-shaped piece formed with a horizontal part 7, and a vertical part $7^a$ secured to bin, and a reduced extension 8 on the vertical part engaging in the recess of the bench; substantially as described.

GEORGE F. WORNSTAFF.

Witnesses:
W. A. PRATZ,
C. F. EBERLE.